United States Patent [19]

Lattin

[11] 4,137,854

[45] Feb. 6, 1979

[54] PLANTING APPARATUS INCLUDING SPRING FOR VIBRATION OF PICKUP SPOKES

[76] Inventor: Michael E. Lattin, P.O. Box 447, Natalia, Tex. 78059

[21] Appl. No.: 754,079

[22] Filed: Dec. 23, 1976

[51] Int. Cl.² ............................................. A01C 7/04
[52] U.S. Cl. ................................... 111/77; 111/34; 221/233; 221/235; 221/254; 222/225; 222/288; 222/349
[58] Field of Search .................... 111/78, 77; 222/367, 222/368, 369, 345, 346, 349, 350, 351, 329, 305, 288, 284; 221/233, 234, 235, 266, 216, 254, 263, 277

[56] References Cited

U.S. PATENT DOCUMENTS

| | | | |
|---|---|---|---|
| 604,738 | 5/1898 | Dykes | 222/369 X |
| 699,699 | 5/1902 | Newberry | 222/305 |
| 773,205 | 10/1904 | Green | 221/254 X |
| 912,296 | 2/1909 | Dykes | 222/369 X |
| 941,579 | 11/1909 | Jay | 111/77 |
| 1,233,205 | 7/1917 | Dye | 222/349 |
| 1,601,280 | 9/1926 | Wsewoloschsky | 221/217 |
| 2,090,525 | 8/1937 | Carrier et al. | 222/369 X |
| 2,495,998 | 1/1950 | Baker | 221/254 X |
| 2,605,023 | 7/1952 | Ward | 111/78 X |
| 3,308,774 | 3/1967 | Keeton | 221/217 X |
| 3,552,601 | 1/1971 | Hansen et al. | 111/77 X |
| 3,627,050 | 12/1971 | Hansen et al. | 221/217 X |
| 3,670,671 | 6/1972 | Lienemann et al. | 111/77 |

FOREIGN PATENT DOCUMENTS

| | | | |
|---|---|---|---|
| 143337 | 11/1935 | Australia | 222/369 |
| 32023 | 3/1922 | Denmark | 221/266 |
| 74647 | 9/1952 | Denmark | 221/266 |
| 294970 | 5/1929 | Fed. Rep. of Germany | 221/217 |
| 2405089 | 8/1975 | Fed. Rep. of Germany | 222/369 |
| 58061 | 9/1953 | France | 222/369 |
| 1112353 | 3/1956 | France | 111/77 |
| 529846 | 5/1955 | Italy | 111/77 |

*Primary Examiner*—Edgar S. Burr
*Assistant Examiner*—Steven A. Bratlie
*Attorney, Agent, or Firm*—Gunn & Lee

[57] ABSTRACT

A planting apparatus is shown having a drive wheel for turning a drive belt connected to an axis extending through a hopper. Inside the hopper, a pickup wheel having individual spokes extending radially outward is rotated by the axis. Each spoke there has an indentation just large enough to receive a seed therein upon rotation through to the bottom of the hopper having seed therein. Upon further rotation, the seed is carried by the spoke to the top of the hopper before being dropped into a funnel shaped flue. A spring loaded tapping mechanism strikes the spokes to insure that the seeds will drop from the spokes into the flue. The individual spokes may be removed for varying the space therebetween, or replaced by other spokes having different sized holes therein for the planting of different sized seeds. The seeds drop through the flue and are delivered to a furrow made by a planting foot and covered by a planter wheel.

2 Claims, 6 Drawing Figures

PLANTING APPARATUS INCLUDING SPRING FOR VIBRATION OF PICKUP SPOKES

BACKGROUND OF THE INVENTION

This invention relates to a planting apparatus and, more particularly, to a planting apparatus that may be used to accurately plant seeds of varying sizes with a predetermined spacing therebetween being dependent upon the type of seeds being planted. A vertically mounted, rotating pickup wheel is located in the hopper with spokes extending radially outward therefrom. The spokes have identations particularly sized to pick up the type of seed being planted. The spacing of the spokes may be varied, or the spokes may be replaced with other spokes having a different size indentation to pick up different size seeds.

BRIEF DESCRIPTION OF THE PRIOR ART

Prior to the present invention, the most typical type of planting apparatus had a hopper with the horizontally mounted plate contained in the bottom thereof. The plate normally had a series of holes along its outer perimeter. A plate retainer located above the plate held the plate in position. Seeds contained in the hopper would fall into the holes of the plate as the plate rotated inside the hopper. As the plate would move under a portion of the plate retainer, any seeds contained in the particular hole would drop through an opening and a flue for planting behind a planter foot.

However, the traditional plate type of planter had considerable problems, especially in the planting of truck crops. First, a plate type of planter had a tendency to break or crush the seeds whenever a hole containing a seed moved under the plate retainer. Also, the repeatability of a plate type of planter was very low, with varying numbers of seeds (if any) being dropped.

Though numerous types of planting apparatuses have been designed and used for many years, the problem of seed breakage and repeatability in the depositing of seeds along the ground has always remained a problem for farmers. The problems become more acute when truck crops are concerned because the price of seeds is a major expense item. Due to the high cost of seeds necessary for truck farming operations, it is essential that the spacing between seeds be uniform and that the correct number of seeds be deposited in the row. Also, the planting apparatus should not damage the seeds by crushing or breaking the seeds with the pickup mechanism.

One fairly complicated system used to allegedly give precision seed planting is shown in U.S. Pat. No. 3,432,075 to Myers. The Myers patent shows a complicated apparatus including a blower, suction pump, vibrator, just to name a few of the components to the complicated system. A special vehicle that would carry all this complicated equipment would also be necessary, which may or may not be an ordinary farm tractor.

SUMMARY OF THE INVENTION

It is an object of the present invention to provide a planting apparatus that will accurately plant undamaged seeds a predetermined space apart, which space depends upon the type of seeds being planted.

It is another object of the present invention to provide a hopper for a planting apparatus, which hopper has a vertically mounted pickup wheel with spokes extending therefrom. The spokes have identations that are particularly sized to pick up individual seeds, depending upon the type of seeds being planted.

The present invention, while being shown as an independently operated single row planter, is designed for use in connection with standard farm machinery wherein many rows are being planted simultaneously by a single tractor. The driving mechanism for turning the drive belt, while being shown as a drive wheel, could be any other type of drive from the tractor that is directly related to the distance traveled by the tractor. The planting apparatus includes a planting foot to which a flue is connected that extends upward into the hopper. Seeds dropped through the flue are covered by a planting wheel.

A planting wheel located inside the hopper is turned by an axis driven by the drive belt. As the spokes on the planting wheel pick up individual seeds in their respective indentations, the seeds will be carried to the top of the planting wheel. At the top of the planting wheel, the spokes are tapped by a spring mechanism to insure that the seeds will fall into a funnel connected to the flue. To vary the number of seeds being planted and the spacing therebetween, only the spokes for the wheel need to be changed. The hopper is particularly designed so that the seeds contained therein will flow to the lower center thereof. The bottom of the hopper is semicircular with the spokes of the planting wheel rotating immediately adjacent the lowermost internal surface.

BRIEF DESCRIPTION OF THE PREFERRED EMBODIMENT

Figure 1:
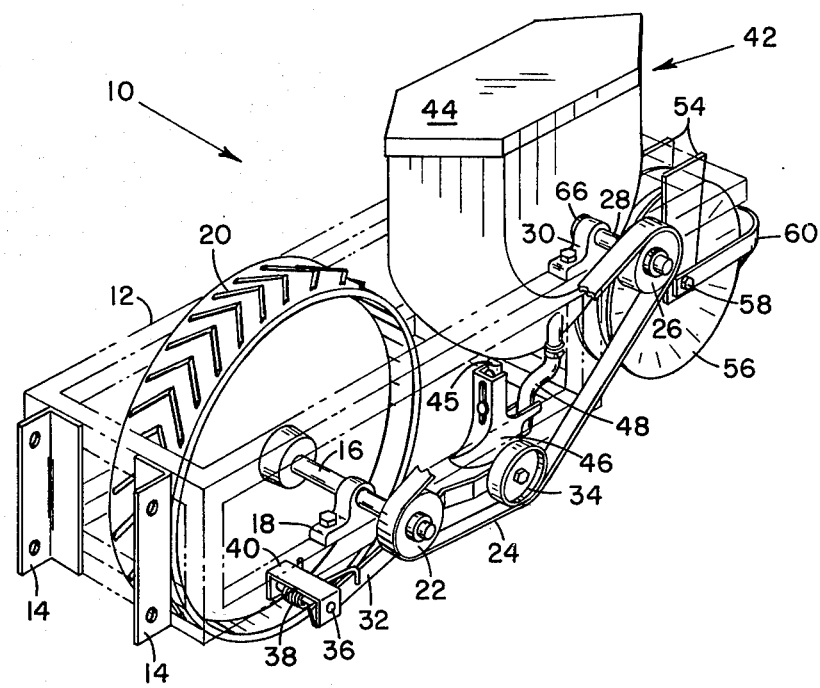
FIG. 1 is a perspective view of a planting apparatus.

Referring now to FIG. 1 of the drawings, there is shown a planting apparatus represented generally by reference 10. The planting apparatus 10 has a frame 12 which may be of any particular configuration, but in this preferred embodiment is shown as a rectangular frame. Attached to the front of the frame 12 is a pair of flanges 14 for connecting the planting apparatus 10 to a tractor (not shown) or other suitable equipment.

Axle 16 is pivotally mounted on frame 12 by means of axle housing 18. The axle 16 is free to turn inside of axle housing 18. Connected rigidly to approximately the center of axle 16 is drive wheel 20. The opposite end of axle 16 (not shown) is also mounted in an axle housing (not shown). On the right end of axle 16 (as viewed in FIG. 1), a pulley 22 is rigidly mounted. Connected to the pulley 22 is a pulley drive belt 24 (partially cut away in FIG. 1 for clarity).

The pulley 22 connects via the drive belt 24 to turn a hopper pulley 26. Hopper pulley 26 in turn causes axis 28 to rotate. Axis 28 is mounted to the frame 12 by means of axle housing 30 located on each side of the frame 12. Tension on the drive belt 24 is maintained by tension arm 32 that has a roller 34 pivotally mounted on one end thereof. The opposite end of the tension arm 32 is spring loaded around pin 36 by means of tension spring 38. Pin 36 connects to frame 12 and bracket 40 to rotatably connect tension arm 32 to frame 12.

Carried on axle 28 is a hopper 42 in which seeds to be planted are located. The hopper 42 may also have additional supporting structure (not shown). The hopper 42 has a cover 44 that may be removed for inserting seeds therein. A foot 45 and shoe 46 for the planting apparatus 10 is rigidly connected to frame 12 and extending downward therefrom. Connected to the rear of the foot 45 and shoe 46 is a flue 48 extending upward to connect to conduit 50 by means of clamp 52. The conduit 50 extends through the lower side of hopper 42.

Mounted on the rear of frame 12 by means of brackets 54 is a planter wheel 56 held in position by axle 58. Also, pivotally connected to axle 58 is a scraper 60 to prevent accumulation of dirt on planter wheel 56.

Figure 2:
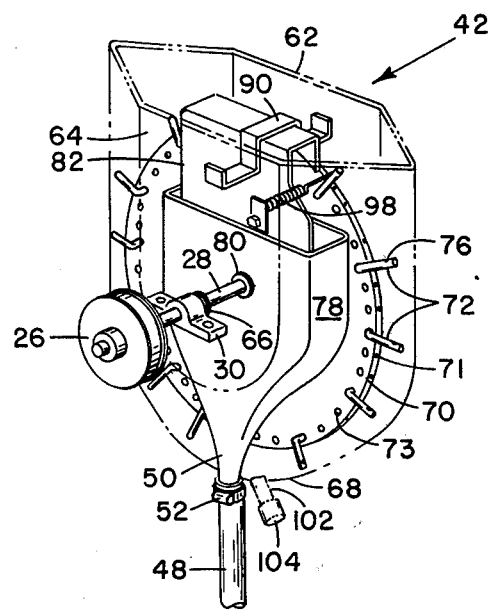
FIG. 2 is a perspective view of the internal and drive components of the hopper shown in FIG. 1.
Figure 3:
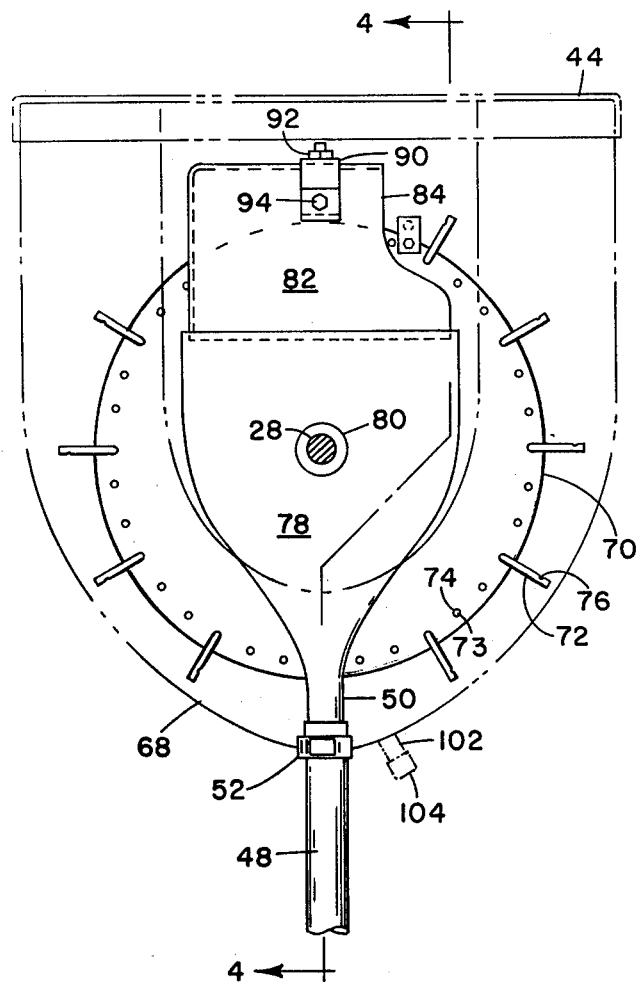
FIG. 3 is an elevated side view of the internal components for the hopper shown in FIG. 1.
Figure 4:
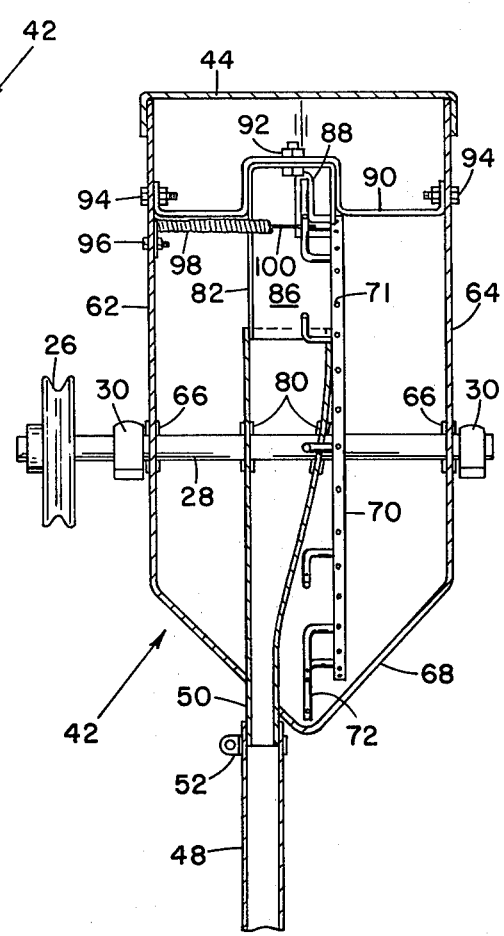
FIG. 4 is a cross-sectional view of FIG. 3 along section line 4—4.

Referring now to FIGS. 2, 3 and 4 in combination, the internal structure for the hopper 42 is explained in more detail. The axle 28 extends through the sides 62 and 64 of hopper 42 via bushings 66. The lowermost portion of the hopper 42 is formed by a semicircular V-shaped botton 68 that extends downward from sides 62 and 64.

Inside the hopper 42 rigidly connected to axle 28 is a pickup wheel 70 with a series of spokes 72 mounted thereon. The spokes 72 are L-shaped and held in holes 74 by set screws 71. The holes 74 are located around the perimeter of pickup wheel 70. Blank holes 74 are filled by plugs 73. On one side of the spoke 72 is an indentation 76 which is sized approximately the same as the size of the individual seeds being planted. The indentation 76 can be more clearly seen in the enlarged perspective view of an individual spoke 72 shown in FIG. 5. The spacing between the spokes 72 may be varied by changing holes 74 in which the spokes 72 are located. Such a change would vary the spacing between seeds in a row for the particular seed being planted.

The axle 28 also extends through a generally funnel shaped extension 78 of conduit 50, which funnel shaped extension 78 is located immediately adjacent to pickup wheel 70. Again, a bushing 80 allows for free rotation of the axis 28 through funnel shaped extension 78. Extending upward from the opening for the funnel shaped extension 78 is a shroud 82 that has an open front 84 and a closed rear portion 86. One side of the shroud 82 is immediately adjacent the outer perimeter of pickup wheel 70. In the closed rear portion 86 is an opening 88 that is just large enough to spokes 72 to move therethrough, as will be subsequently described in more detail. A bracket 90 is connected to shroud 82 by means of bolt 92 and to the sides 62 and 64 by means of bolts 94. The bracket 90 rigidly holds the shroud 82 into position with the lowermost portion of the shroud 82 being received inside of the upper opening for funnel shaped extension 78.

Mounted on side 62 by means of bolt 96 is a spring 98 that extends perpendicular to side 62 into the open front 84 of shroud 82. A straight extension 100 of spring 98 extends into the normal rotational path of spokes 72, as will hereinafter be explained in more detail.

METHOD OF OPERATION

Figure 5:
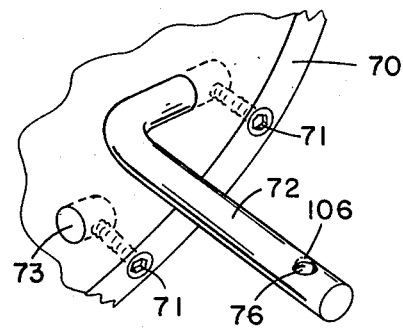
FIG. 5 is an enlarged perspective view of a single spoke carrying a seed in an indentation therein.

To use the planting apparatus 10, a person first needs to known the planting requirements for the particular seed being planted. The foot 45 and shoe 46 can be adjusted for the depth requirements for the particular seed being planted. The spokes 72 should be spaced along the wheel to give the ideal distance between the seeds being planted in the row. The distance between seeds can be varied anywhere from approximately an inch to six feet by varying the number and spacing of the spokes 72, varying the size of pulleys 22 and 26, or varying the size of drive wheel 20 or pickup wheel 70. The spokes 72 used on pickup wheel 70 should be particularly designed for the seed being planted. The identation 76 in the spokes 72 should be just large enough to receive the seed being planted therein with slightly over half of the seed extending therefrom. This is particularly important in the planting of truck crops wherein the seeds are very expensive and the overplanting of seeds and subsequent thinning would be exceedingly costly. FIG. 5 shows an enlarged perspective view of a spoke 72 and the identation 76 therein. A seed 106 (shown in broken lines) has been picked up by the spoke 72 for delivery to the funnel shaped extension 78.

Upon lowering the entire frame 12 for the planting apparatus 10, the drive wheel 20 and planting wheel 56 will come to rest on the ground. As the planting apparatus shown in FIG. 1 is pulled to the left, drive wheel 20 will turn in the counterclockwise direction. In turn, axle 28 via pulley 26, drive belt 24 and pulley 22 will turn in the counterclockwise direction (see FIG. 3). As the axle 28 turns in the counterclockwise direction, so will the pickup wheel 70. As the pickup wheel 70 moves in the counterclockwise direction, the spokes 72 will rotate to the V-shaped bottom 68 of the hopper 42. From the V-shaped bottom 68 of the hopper 42, the spokes 72 will pick up a seed in the respective indentation 76 located therein (see FIG. 5). The seed will in turn be carried with the spoke 72 to approximately the top of the wheel 70. At approximately the top of the wheel 70, the respective spoke 72 carrying a seed in indentation 76 will be tapped by the straight extension 100 of spring 98. The tapping of the spoke 72 causes the seed to fall from the identation 76 into funnel shaped extension 78. The shroud 82 simply insures that the falling seed will not miss the funnel shaped extension 78. While some seeds will fall from the indentations 76 without the necessity of tapping action by the straight extension 100 of spring 98, the tapping simply insures the falling of the seeds when the spoke 72 is at approximately the top of wheel 70. The falling seed which is received in funnel shaped extension 78 will continue to fall through conduit 50 and flue 48 for dropping immediately behind foot 45 and shoe 46 and covering by planter wheel 56.

Figure 6:
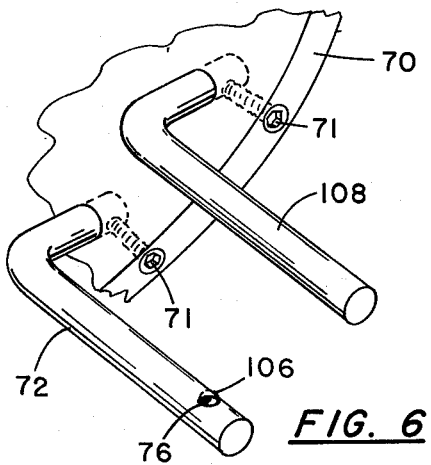
FIG. 6 is an enlarged perspective view of a pair of spokes, the first being blank to bend a spring for tapping the second spoke having a seed carried in an indentation therein.

If the spacing between spokes 72 are so far apart that spring 98 does not hit the spoke 72 carrying the seed with a springing force, the tapping may not be sufficient to insure the seeds 106 will fall from the indentations 76. Therefore, a blank spoke 108, as shown in FIG. 6, may be inserted in a blank hole 74 immediately prior to the spoke 72 picking up seeds 106 in indentations 76 thereby causing a springing action.

The particular shape of the hopper 42 allows spokes 72 to continue to pick up and plant the seeds without skipping, even though only a few seeds are contained inside of hopper 42. Clearance between the spokes 72 and the V-shaped bottom 68 is minimal. By using such a design for the hopper 42, small, expensive seed can continue to be planted with almost no waste or skipping involved. Since the seeds do not have to move between sliding surfaces, there is no danger of crushing or damaging the seeds.

It has further been found that an indentation of slightly larger than the typical small cross-section of an oblong seed results in one end of the seed being received in the indentation 76 and the seed carried to the top of the wheel 70 with essentially no misses in planting the oblong seeds. This is true even though squash or other types of truck crops having oblong seeds are being planted.

It has been found that fiberglass is a very suitable substance for the making and forming of hopper 42, as well as the funnel shaped extension 78. Where the conduit 50 extends through the V-shaped bottom 68 of the hopper 42, they can be bonded together with fiberglass and an appropriate resin. By use of fiberglass, the hopper 42 can be formed on a mold, as well as the top 44 and the funnel shaped extension 78 and conduit 50. Holes can then be cut for the axle 28 and the appropriate bushings 66 or 80. Further included in the V-shaped bottom 68 of the hopper 42 is a conduit 102 and plug 104. By removing the plug 104, any seeds remaining in the hopper 42 can be drained therefrom through conduit 102.

I claim:

1. A planting apparatus adapted for attachment to farm machinery for planting seeds of varying sizes comprising:
    a frame;
    hopper means mounted on said frame, said hopper means having a curved V-shaped lower edge;
    a planting shoe connected to and extending downward from said frame;
    flue means extending upward from behind said planting shoe to inside said hopper means;
    axial means pivotally mounted on said frame, said axial means extending inside said hopper means;
    drive means connected to said axial means for turning said axial means upon movement of said planting apparatus;
    a pickup wheel inside said hopper means, said pickup wheel turning with said axial means;
    interchangeable spoke means extending radially outward from said pickup wheel, each said spoke means having in its leading edge, an indentation constructed and arranged to receive a seed therein upon rotation of said spoke means into seeds in said hopper means, said indentation being slightly larger than said seeds being planted so that only one of said seeds may be contained within said indentation; a spring fastened at one end by bracket means to said hopper and positioned so that the free end of said spring extends into said pickup wheel, upon rotation of said spokes said spring striking said spokes to vibrate said seeds from said indentations and into an opening in said flue, said seed being dropped behind said planting shoe via said flue means, said indentation in said spoke means rotating just above said curved V-shaped lower edge;
    means for enabling the planting of substantially all the seeds without skipping, said enabling means positioning said spoke means with a minimum clearance above said curved V-shaped lower edge; and
    a planting wheel rotatably mounted on said frame behind said planting shoe for covering said seed.

2. The planting apparatus as recited in claim 1 including a shroud means above said opening in said flue means, said shroud means allowing rotation of said spoke means therethrough while simultaneously causing seed falling therefrom to be received in said opening.

* * * * *